United States Patent
Lannes et al.

(10) Patent No.: US 8,613,972 B2
(45) Date of Patent: Dec. 24, 2013

(54) PAPERMAKING COATING STATION WITH PRESSURE-SENSITIVE FILM ROLL

(75) Inventors: Petteri Lannes, Lappeeranta (FI); Tatu Markus Kristian Pitkänen, Nummenkylä (FI)

(73) Assignee: Metso Paper, Inc., Helsinki (FI)

( * ) Notice: Subject to any disclaimer, the term of this patent is extended or adjusted under 35 U.S.C. 154(b) by 632 days.

(21) Appl. No.: 12/744,842

(22) PCT Filed: Jan. 22, 2009

(86) PCT No.: PCT/EP2009/050714
§ 371 (c)(1),
(2), (4) Date: Jun. 22, 2010

(87) PCT Pub. No.: WO2009/092761
PCT Pub. Date: Jul. 30, 2009

(65) Prior Publication Data
US 2011/0020532 A1    Jan. 27, 2011

Related U.S. Application Data

(60) Provisional application No. 61/023,343, filed on Jan. 24, 2008.

(51) Int. Cl.
*C23C 16/52* (2006.01)
*B05C 11/04* (2006.01)

(52) U.S. Cl.
USPC ............... 427/8; 118/663; 118/668; 118/692; 118/712; 427/356

(58) Field of Classification Search
USPC ............... 118/663, 668, 670, 692, 712, 713, 118/714; 427/8, 420
See application file for complete search history.

(56) References Cited

U.S. PATENT DOCUMENTS

| | | | |
|---|---|---|---|
| 4,300,909 A * | 11/1981 | Krumhansl | 436/50 |
| 5,048,353 A | 9/1991 | Justus | |
| 5,379,652 A | 1/1995 | Allonen | |
| 5,505,995 A * | 4/1996 | Leonard | 427/348 |

(Continued)

FOREIGN PATENT DOCUMENTS

| | | |
|---|---|---|
| DE | 19827234 A1 | 12/1999 |
| EP | 1493565 A2 | 1/2005 |

(Continued)

OTHER PUBLICATIONS

International Search Report for PCT/EP2009/050714.

(Continued)

*Primary Examiner* — Alexander Weddle
(74) *Attorney, Agent, or Firm* — Stiennon & Stiennon

(57) ABSTRACT

A counter roll (26) is positioned to engage a paper or board web (24) in a paper or board making machine along a contact line. A pressure-sensitive EMFi film (28) is disposed on the counter roll to measure the pressure profile of the web along the contact line. A coating apparatus (22) applies a coating to the web passing over the counter roll (26), and a pressure profile of the applied coating is measured by the pressure-sensitive film (28) on the counter roll (26). The pressure-sensitive film (28) may also be disposed to detect details of coating application in a curtain coater (30). Moreover, the film may be driven to provide adjustable vibration for cleaning the coater, or conditioning or controlling the coating flow.

18 Claims, 3 Drawing Sheets

(56) References Cited

U.S. PATENT DOCUMENTS

| | | | |
|---|---|---|---|
| 5,674,551 A * | 10/1997 | Koskinen et al. | 427/8 |
| 6,132,807 A * | 10/2000 | Hess et al. | 427/356 |
| 2002/0179270 A1 | 12/2002 | Gustafson et al. | |
| 2003/0144119 A1 | 7/2003 | Kleiser et al. | |
| 2004/0020618 A1* | 2/2004 | Gron et al. | 162/205 |
| 2004/0079147 A1* | 4/2004 | Menp | 73/159 |

FOREIGN PATENT DOCUMENTS

| | | | |
|---|---|---|---|
| WO | 0116424 A1 | 3/2001 | |
| WO | 0173197 A1 | 4/2001 | |
| WO | 2004102141 A2 | 11/2004 | |
| WO | 2006075055 A1 | 7/2006 | |
| WO | 2006075056 A1 | 7/2006 | |
| WO | WO 2006075055 A1 * | 7/2006 | |
| WO | WO 2006075056 A1 * | 7/2006 | |
| WO | 2009092761 A2 | 7/2009 | |

OTHER PUBLICATIONS

Written Opinion of the International Searching Authority for PCT/EP2009/050714.

* cited by examiner

PAPERMAKING COATING STATION WITH PRESSURE-SENSITIVE FILM ROLL

CROSS REFERENCES TO RELATED APPLICATIONS

This application is a U.S. national stage application of International App. No. PCT/EP2009/050714, filed on Jan. 22, 2009, the disclosure of which is incorporated by reference herein. This application claims priority on U.S. App. No. 61/023,343, filed on Jan. 24, 2008.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to paper and board making machines in general, and more particularly to coating stations in such machines. The term coating station is meant to include a sizer or sizing station in which size is applied to the paper or board surface or surfaces in the drying section of a paper or board machine.

In coating paper or board web, either direct or indirect application can be used. In direct application, coating material is spread on the web as it moves past an application area on the surface of a counter roll. In indirect application, coating material is first spread on a film-transfer roll or other transfer surface from which it is transferred onto the web in a coating nip. In direct application it is further possible that the web passes through a size or coating bath which is formed between two rolls and then runs through a nip which is formed between the two rolls and which forms the lower outlet of the size or coating bath. Coating material is often applied excessively and the amount of coating that remains on the moving substrate is adjusted, i.e., coating is metered by means of a doctoring element. A doctor blade or a rotating doctor rod can be used as the doctoring element which is pressed against the moving substrate. The load of the doctoring element is provided by means of loading hoses operating with a pressure medium or a mechanical force driving the doctoring element. It depends on the load of the doctoring element how much coating material is carried away from the application area along with the moving web. There are also contact-free coating methods that require no doctoring element. In these methods, all of the applied coating material remains on the web, whereby the metering of coating takes place by means of a pump or a valve that feeds coating material into the application device.

However, accurate measurement and control of the coating quality has become increasingly difficult with the increase of machine width and speed which are nowadays used to improve the paper machine performance. In particular, typical CD-scanning devices employing optical measurement methods in scanning measuring heads suffer from an immanent inaccuracy of the measured values with respect to the web movement; i.e. the measured values are far away from a snap-shot of a CD-profile of measured coating quality.

FI 20055019 (WO 2006/075055) discloses a method for measuring a nip pressure and/or a pressure profile, wherein a nip-forming roll is fitted with a pressure sensor under a cover layer which is protective and functions as a spring on top of the sensor, and the nip pressure delivers to the bottom surface of the cover layer a deformation proportional to the nip pressure and the deformation compresses the sensor, which responds to the deformation by generating an electric signal.

FI20055020 (WO 2006/075056) discloses a method for measuring a nip pressure and/or a pressure profile, wherein a nip-forming roll is fitted with a pressure sensor under a cover layer which is protective and functions as a spring on top of the sensor, and the nip pressure delivers to the bottom surface of the cover layer a deformation proportional to the nip pressure and the deformation compresses the sensor, which responds to the deformation by generating an electric signal.

Metso Paper, Inc. markets an intelligent roll, known as the iRoll™ tension measuring roll which automatically measures tension profiles and their quality online. FI20055019 (WO 2006/075055) (iRoll tension profile measuring) and FI20055020 (WO 2006/075056) (iRoll pressure profile measuring) generally focus on measuring CD profiles.

Pressure-sensitive electromechanical film (EMFi) film has been used as a microphone and a speaker. There are applications, inter alia, in active noise reduction. See e.g. http://www.panphonics.fi/applications.html. The speaker/noise reduction applications are based on the vibrating ability of the film. As a measuring sensor or a microphone, the film converts pressure/sound into an electric signal, but as a speaker it converts the electric signal to vibration. The technique is cost-effective so that it may be utilized in covering large wall/ceiling areas e.g. for adjusting noise in offices, between common and private premises.

It is known to measure the position of the edge of the web or the wire by a pressure-sensitive film sensor. It is known to measure the tension and linear-load profile by a film sensor. It is known to place a pressure-sensitive film sensor behind a metal plate in the key pad of an elevator to identify the touch of a finger on the surface of the metal plate.

What is needed is a method and an apparatus for quickly and accurately determining quality characteristics or details of a coating applied in paper or board coating stations. This method and apparatus shall be applicable to coating stations of types in which a coating nip is present or absent.

SUMMARY OF THE INVENTION

The inventors have found that measurement of the pressure profile in the CD-direction in a coating apparatus allows monitoring and/or control of characteristics or attributes, such as a coating thickness profile, of the coating in the CD-direction. Thus, the present invention provides a method and apparatus for determining the pressure profile in a paper or board web coating station.

Since the measurement of the complete pressure profile in the CD-direction is made within less than one revolution of a measuring roll, the obtained CD-profile is close to simultaneous snap-shot of the characteristics across the whole web.

Thus, quality measurement is accurately and quickly possible, so that the measured quality can even be used for control purposes of the coating station.

In the present invention a counter roll is positioned to engage a paper or board web in a paper or board making machine along an overlap area. A pressure-sensitive film is disposed on the counter roll to measure the pressure profile of the web in CD-direction along a contact line extending in the axial direction of the counter roll and positioned within the overlap area. A coating device applies a coating to the web passing over the counter roll, and a pressure profile of the applied coating is measured by the pressure-sensitive film on the counter roll. In response to the detected information about the coating profile, the coater may be controlled to adjust the coating profile to more nearly match desired coating profile targets.

Additionally, the apparatus of the invention for determining the pressure profile in a paper or board web coating station requires low changes in equipment and may therefore be readily installed in an existing paper or board web coating station.

Using the apparatus of the present invention allows providing a paper or board web coating station in which a counter roll employs vibration for cleaning, conditioning, or controlling the coating flow. For this, the film may be driven to provide adjustable vibration for cleaning the coater, or conditioning or controlling the coating flow.

Further objects, features and advantages of the invention will be apparent from the following detailed description when taken in conjunction with the accompanying drawings.

DESCRIPTION OF THE PREFERRED EMBODIMENTS

Figure 1:
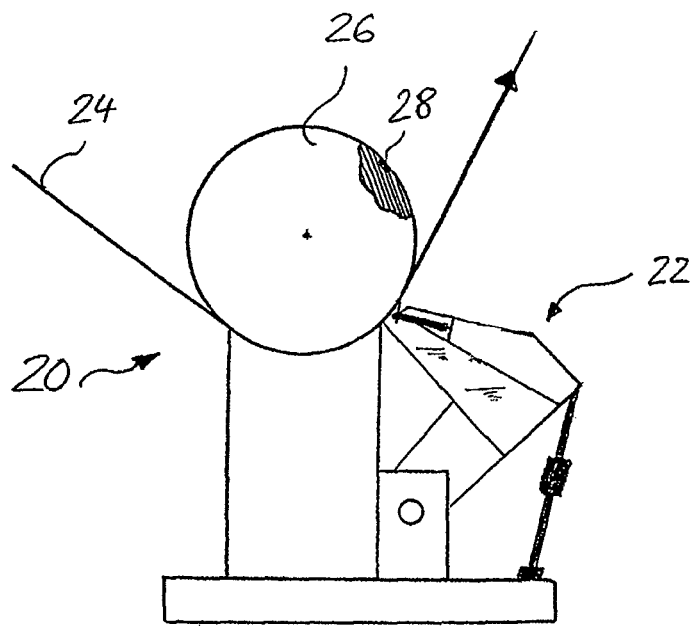
FIG. 1 is a schematic view of a coating station employing a blade coater in a paper or board machine of this invention.

Referring more particularly to FIGS. 1-6, wherein like numbers refer to similar parts, a coating station 20 in a paper or board making machine is shown in FIG. 1. The coating station 20 has a coating apparatus 22 disposed with respect to a paper or board web 24 which runs over a counter roll 26.

Figure 2:
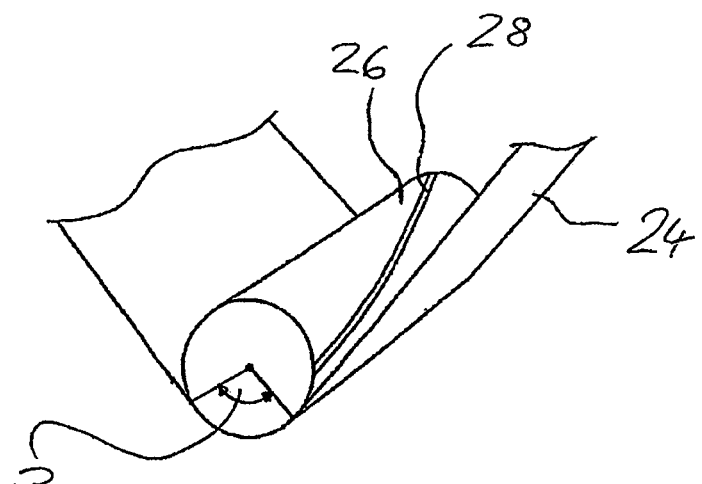
FIG. 2 is a perspective view of a counter roll in the coating station of FIG. 1.

The counter roll 26 may be a Metso Paper, Inc. iRoll™ intelligent tension or pressure measuring roll, such as described in WO 2006/075055 and WO 2006/075056, the disclosures of which are incorporated by reference herein. As shown in FIG. 2, the counter roll 26 is fitted with an EMFi-film pressure sensor 28 which is shielded by a cold-curing polymer cover (not shown). The sensor 28 is fitted for example in an inclined groove cut in the roll and topped by one or more cover layers. In more detail, FIG. 2 illustrates a sensor 28 which is planted on a roll 26 or preferably buried under a coating of the roll and which is a segment of a spiral helix. The sensor has a helical pitch in the running direction of a web 24 which in the illustrated example is slightly less than an overlap angle 3. The overlap angle refers to a section of the roll, which is in contact with the web. In FIG. 2, the sensor is depicted outside the overlap angle 3. A protection groove can be prepared for the sensor 28 for planting the sensor therein. Thus, the sensor is preferably more of less flush with the surrounding surface. A pressure produced by the web 24 is transmitted to the sensor 28 by a possibly overlaid coating. The sensor itself is fixed for example by sizing or taping. The sensor must be planted on a smooth surface and the overlaid coating must be consistent in quality. Because the sensor is quite thin, its planting without a protection groove is possible. The overlaid coating can be ground or flattened for smoothness to avoid the formation of a bulge on the roll surface coincident with the sensor. Other type pressure sensitive films may be used. The sensor 28 measures forces created against the roll and their cross-profiles. The counter roll 26 is positioned so as not to form a nip at a line of contact between the web and the counter roll where the coating is being applied and a pressure profile is being detected. The line of contact is in the overlap region 3 where the web engages or overlaps the counter roll. The counter roll with the spiral sensor rotates against the web, such that the pressure is measured at a location which moves across the web in the cross-machine direction as the counter roll rotates.

Figure 3:
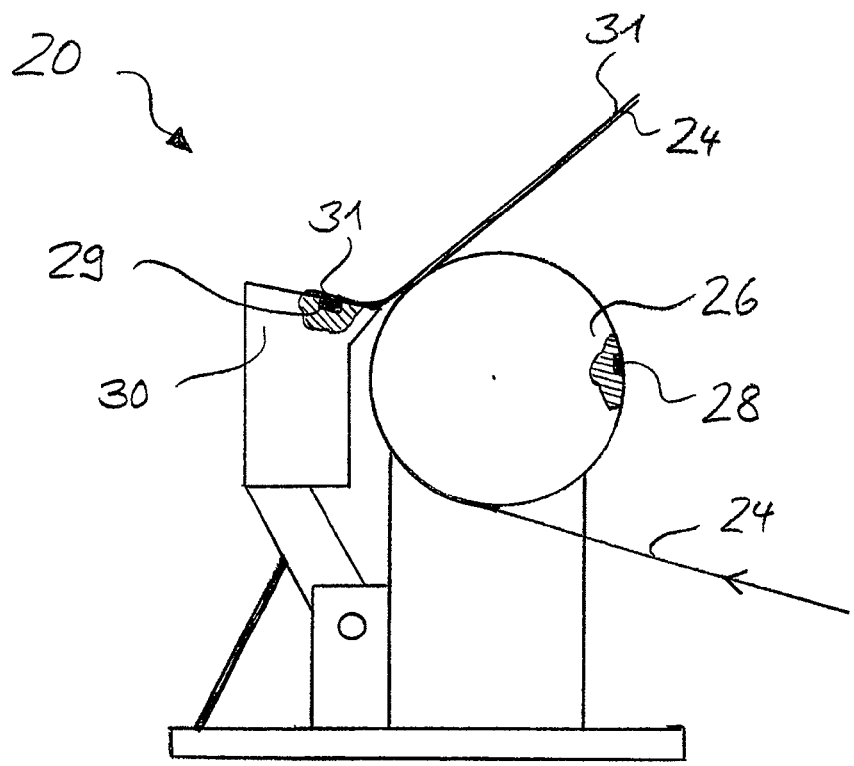
FIG. 3 is a schematic view of a coating station employing a slide curtain coater in a paper or board machine of this invention.

The counter roll 26 with pressure sensor 28 shown in a locally cut portion of counter roll 26 in FIG. 1 may be used with a variety of coating apparatus 22 in the coating station, for example with a blade coater as shown in FIG. 1, or with a slide curtain coater 30 as shown in FIG. 3. In operation, the paper or board web 24 passes over the counter roll 26 while a coating is applied from the coating apparatus 22 to the web. The application of the coating thereby applies a pressure profile in the cross-machine direction to the web and hence to the counter roll, the pressure profile being measured by the pressure sensor 28. The results of the sensor measurement may then be used to adjust the coating apparatus 22 or other aspects of paper or board machine to affect coating attributes or quality in the desired manner.

The pressure which presses the coating to the web is measured by the pressure sensitive film sensor. The measuring is done from the web here (not in a nip). The coating can be solid, for example a laminated film or the like, or the coating may be a powder or dry coating material, or the coating may be a fluid, for example it can be a liquid dispersion of water or other solvent and rock material, polymer size or glue, it also can be a spray including gas and liquid drops.

The sensing counter roll may be used with a variety of coating apparatus, for example different coating apparatus manufactured by Metso Paper, Inc., and, as will be discussed later, also with size-press.

Figure 4:
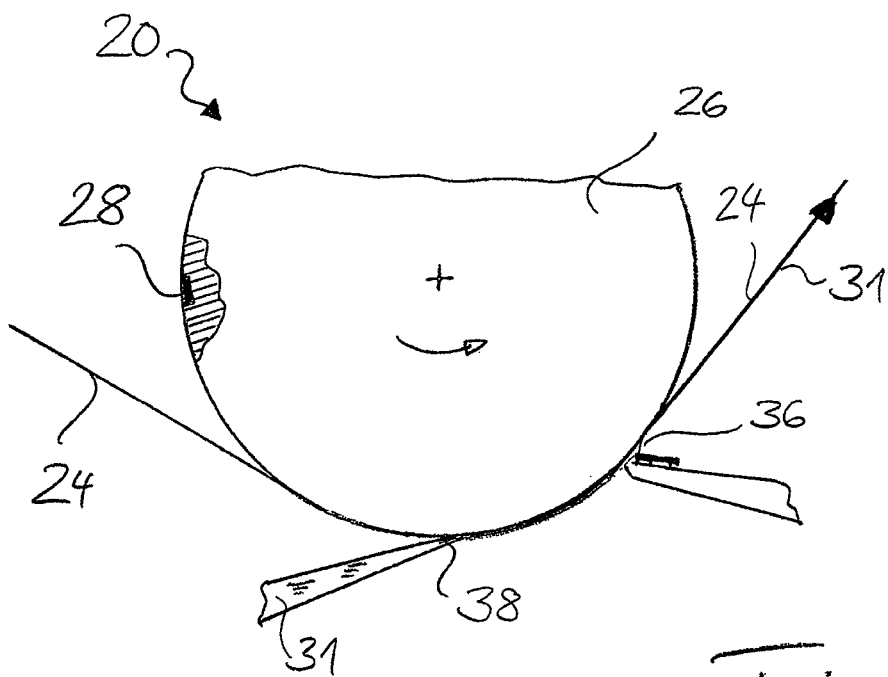
FIG. 4 is a fragmentary side elevational schematic view of a coating station of this invention employing a Metso Paper, Inc. OptiCoat™ Jet coating apparatus.

When used with the OptiCoat™ (ValCoat™) Jet coater 32, as schematically shown in FIG. 4, the sensor 28 on the counter roll 26 can measure the coating jet profile as applied from the jet 38 by measuring its pressure profile from the counter roll and/or the same sensor 28 may be used to measure the pressure of the blade profile where the doctor blade 36 engages the coated web, which equals the coating profile. The data taken from the sensor may be utilized in profile adjustment, diagnostics, etc. It should be noted that an additional EMFi sensor could also be positioned within the lip/chambers of the jet coater (not shown).

Figure 5:
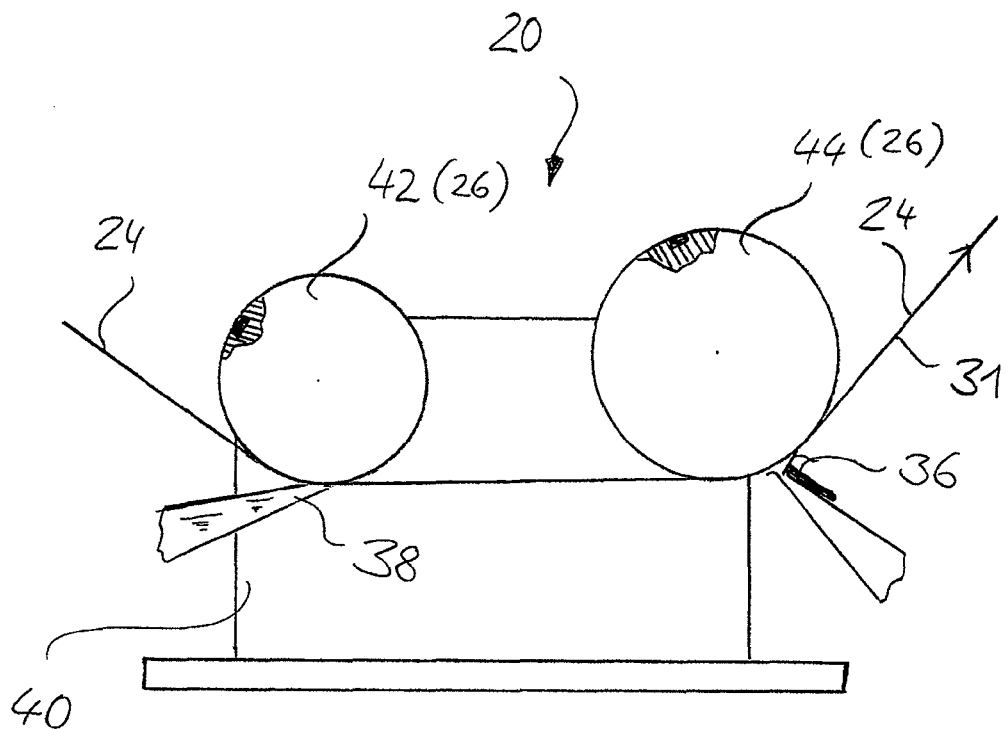
FIG. 5 is a fragmentary side elevational schematic view of a coating station of this invention employing a Metso Paper, Inc. OptiCoat™ Jet Duo™ coating apparatus.

A counter roll 26 with sensor 28 may also be used with the Metso Paper, Inc. OptiCoat™ Jet Duo™ coating apparatus 40, as is schematically shown in FIG. 5, where the jet 38 is directed to a first counter roll 42 (26), and the blade 36 engages a second downstream counter roll 44 (26). Both counter rolls may have sensors 28, or, if only blade profile measurement is desired, only the second counter roll 44 may be provided with a sensor 28. The arrangement in this coating station 20 is simpler in that one sensor measures only one factor.

The counter roll 26 with sensor 28 may be used with a Metso Paper, Inc. OptiBlade™ short dwell coater coating apparatus, such as is schematically shown in FIG. 1. In short-dwell coaters, it is possible to measure the pressure profile of the blade in the cross-machine direction on each rotation of the roll, yielding a coating amount profile.

In coating apparatus employing the Metso Paper, Inc. AutoBlade™ blade metering technology, which adjusts coating profile in both the cross-machine direction and the machine direction, in an arrangement similar to the one shown in FIG. 1, the counter roll with sensor observes the profile of the coating film in the gap between the spreader roll and the counter roll (surface pressure caused by the coating color against the roll). It is also possible to have a further sensor on the spreader roll, whereby it can be used in measuring application pressure+profiles applied on the surface of the roll). In particular, the pressure profile at the doctor blade is measured.

Figure 6:
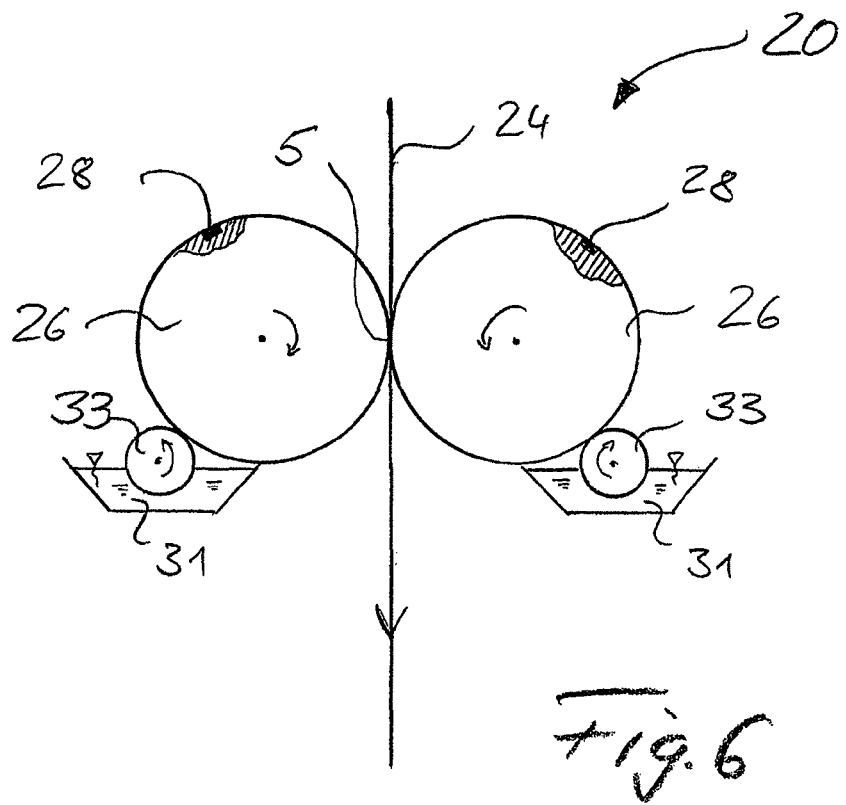
FIG. 6 is a schematic view of a size-press to which the invention is applied.

FIG. 6 schematically shows a size-press as a coating station 20 which has two counter rolls 26 each contacting the web 24 from either side thereof to form a coating nip 5 therebetween. In this indirect size press application rolls 33 immersed into a bath of size are used to apply the size (as the coating 31) onto the surfaces of counter rolls 26 and then the size is transferred to the web 24. At least one of counter rolls 26 (here both) are provided with the sensor 28 which senses a pressure profile along the line of contact; i.e. the coating nip 5 in this embodiment. The application rolls 33 may be provided with individual sensors (not shown) and/or the sensors 28 of the counter rolls 26 may further be used to measure a pressure profile in the nip between counter roll 26 and application roll 33.

The coating station 20 may be readily employed with existing paper or board machines, allowing the existing machine to be rebuilt by updating the preexisting counter rolls with an intelligent iRoll type roll and automation update, application and blade profile measurement & profile adjustments, yielding a measurement which is much quicker than the coating profile coming from the measuring scanner of a prior art station.

For monitoring and control of the coating device, a further pressure-sensitive film sensor 29 may be used for measuring the plane and nose of the slide curtain coater 30, such as at the coating station shown in FIG. 3. The film sensor may be installed below a suitable cover onto surfaces in contact with the coating color 31 flow of the curtain coater 30 and, where desired, the sensor may even be located below a metal element. Thus, the film sensor 29 may be positioned within the curtain coater to measure coating color flow profile, thickness profile, flow rate profile, etc., as well as the position of the edge of the coating color by film-sensor bits placed on the edge, such that the sensor identifies the point of the coating color edge. Likewise, the sensor may identify the widths of the different layers in a multi-layer coating. The sensor 29 may make different measurements in the coater nose and its tip: monitoring of the creation point of the curtain (profile), detaching of the curtain from the nose, flapping at the starting point etc. The sensor may measure contact pressure on the edge strips (on the plane, at the point of the curtain), it can be optimized so that the curtain barely stays fastened on the edges. Moreover, the sensor may measure the nozzle gap profile, e.g. dirtying diagnostics etc.

In the coating process, a further application of the sensor described above is an application for measuring periodical changes in the longitudinal tension profile of the web. Such periodical changes are an indicator of irregularities in the coating process (or the paper or board making process). For this sensor application, a sensor equipped roll (iRoll made by Metso Paper, Inc.) is used as a non-contacting sensor roll. Air is blown between the web and the roll, which air form an air cushion and allows to move (turn) the roll at different peripheral speed/direction than the movement of the web. In this way, irregularities which are in synchronism with the movement of the sensor-equipped counter roll can be sensed since the sensing period (usually once in one revolution) of the non-contacting roll is different from the counter roll. When evaluating the so measured periodical changes in longitudinal tension profile, e.g. dirt or other irregularities on the counter roll or in the coating device can be monitored.

It is noted that it is possible to modify the above application of the non-contacting roll in that, e.g. the roll as such is a perforated roll which allows to blow air out from inside the roll mantle to float the web.

It is further possible to replace the non-contacting sensor roll by a rocking sensor beam which is equipped with the same sensing technology as described above with respect to the counter roll and/or the coating station. The sensor beam extends transverse to the moving direction of the web. When air is also blown out from the surface of the beam facing the web or is blown between the beam surface and the web, the web floats with regard to or above the beam. The beam may be adapted to move in or against the movement of the web. The signals from the beam sensor may be used in the same manner as described above, i.e. to identify periodical changes in longitudinal tension profile of the web to conclude on the presence of irregularities in the coating station, such as e.g. dirt on the counter roll. It is noted that this application of a sensor in combination with a floating web may also be applied to a turning device in a paper machine/coating station to conclude on irregularities in connection with the paper making or coating from periodical changes in longitudinal tension of the web.

The sensor used in the described embodiments can be an EMFi (dynamic) or some other known film sensor measuring static pressure, for example, a force sensing resistor (FSR™) sensor manufactured by IEE SA of Luxemburg, see http://www.iee.lu/nav02/technology.htm or a Peratech quantum tunneling composite (QTC) force sensor, see http://www.peratech.co.uk/sensors.htm, manufactured by Peratech Ltd, of Brompton on Swale, Richmond, United Kingdom. The sensors are extremely sensitive and identify, if required, contact pressure even behind a metal plate. Apart from the above described slide curtain coater 30, the sensor can be applied to other types of coating stations, e.g., for measuring the profile of the jet lip.

The pressure-sensitive film sensor 29, used as a further sensor, converts pressure/sound into an electric signal, but the sensor, when driven by an appropriate controller or driver supplying the requisite electric signal, serves as a speaker which converts the electric signal to vibration. The use of the film producing easily adjustable vibration is employed with a coating station involving a curtain coating apparatus 30, as shown in FIG. 3.

The vibrating film sensor may be integrated into edge strips to bring about cleansing and/or "friction adjustment" of edge strips. The vibration of the film keeps the edges clean of coating color and, by means of vibratory motion, the friction between the curtain and the edge strip can be adjusted. By this, it is possible to get rid of special treatment materials or covers requiring continuous renewal.

In a curtain coater, the vibrating film may be used in slide-plane nose applications:

a vibrating film below the nose at the detaching point of the curtain, this prevents the coating color from hardening on the surfaces;

a vibrating film for the nose at the detaching point of the curtain, this adjusts/conditions the detaching point.

In the curtain coater, the vibrating film may be used for control of coating color flow on the plane:

the coating color flow on the plane may be affected and e.g. its profile by the vibrating film (vibration affects the friction between the coating color and the plane)

by adjusting the vibration amplitude and frequency, it is possible to contribute to in which layer and which depth it especially affects. Cleansing of the nozzle, chambers, etc., internal chosen targets of the curtain beam (in the most difficult points is integrated an electro-mechanic film, vibrating at a desired, possibly adjustable frequency).

It is understood that the invention is not limited to the particular construction and arrangement of parts herein illustrated and described, but embraces all such modified forms thereof as come within the scope of the following claims.

It is further noted that the line of contact as is defined in the appended claims shall extend in axial direction of the counter roll. Further, this line of contact lies within the overlap range between the web and the counter roll, i.e. in that part of the web travel path in which the sensor faces a coated portion of the web. The line of contact may, thus, lie outside a coating nip if there is such nip; but the line of contact may also lie within a coating nip.

The invention claimed is:

1. A process for measuring on a counter roll a pressure profile in a cross-machine direction where a coating is applied to a paper or board web and so as not to form a nip at a line of contact between the paper or board web and the counter roll where the coating is being applied and the pressure profile is being measured, comprising the steps of:
   passing a paper or board web over a counter roll having a pressure-sensitive film sensor disposed thereon, the paper or board web forming an overlap angle as it wraps the counter roll;
   applying a coating to the web as it passes over the counter roll such that the coating is applied directly to the web within the wrap angle by a coater not forming a nip at a line of contact between the paper or board web, to thereby apply a pressure profile in a cross-machine direction to the counter roll and to the pressure-sensitive film sensor disposed thereon; and
   measuring the pressure profile by the pressure-sensitive film sensor along a line of contact where the coating is applied to the web without forming a nip in an overlap range between the web and the counter roll.

2. The process of claim 1 wherein the step of applying a coating to the web comprises a step selected from the group consisting of applying a laminated film, applying a powder or dry coating material, applying a fluid, applying size.

3. The process of claim 1 wherein the step of applying a coating to the web comprises applying a liquid dispersion of water or other solvent.

4. The process of claim 3 wherein the coating is applied as a spray including gas and liquid drops.

5. The process of claim 1 wherein the step of applying a coating to the web comprises engaging a doctor blade with the coated web as it passes over the counter roll.

6. The process of claim 1 wherein the step of applying a coating to the web further comprises discharging a coating from a jet onto the web ahead of a doctor blade, and wherein a pressure profile is measured where the jet applies coating to the web and along a line of contact where the doctor blade is positioned against the web.

7. The process of claim 1 wherein the step of applying a coating to the web further comprises discharging a coating from a jet onto the web on the counter roll and wherein following the counter roll a doctor blade engages the coating on the web on a second counter roll spaced from the counter roll and having a pressure-sensitive film sensor, wherein a pressure profile is measured along a line of contact where the doctor blade engages against the web.

8. The process of claim 1 wherein the step of applying a coating to the web as it passes over the counter roll comprises discharging a coating from a slide curtain coater onto the web as it passes over the counter roll.

9. The process of claim 1 further comprising the step of utilizing the pressure profile measurements to adjust a coating profile on the web.

10. The process of claim 1 wherein the step of applying a coating to the web comprises applying the coating with a blade coater.

11. A coating station in a paper or board machine comprising:
    a counter roll engaging a paper or board web along a contact line in an overlap range forming an overlap angle between the counter roll and the web;
    a pressure-sensitive film sensor disposed on the counter roll to measure the pressure profile of a web along the contact line; and
    a coating apparatus positioned with respect to the counter roll to apply a coating to the web within the overlap angle, as the web passes over the counter roll, the coating apparatus arranged so as not to form a nip at a line of contact between the web and the counter roll where the coating is being applied such that a pressure profile of the web with applied coating can be measured by the pressure-sensitive film sensor on the counter roll.

12. The process of claim 11 wherein the coating apparatus is a blade coater.

13. The apparatus of claim 11 wherein the coating apparatus further comprises a doctor blade which is positioned to engage the coating on the web as the web passes over the counter roll and within the overlap angle.

14. The apparatus of claim 13 wherein the coating apparatus further comprises a coating jet applicator which discharges coating onto the web ahead of the doctor blade and wherein the pressure-sensitive film sensor is configured to determine a pressure profile measured along a line of contact where the doctor blade is positioned against the web.

15. The apparatus of claim 11 wherein the coating apparatus further comprises a coating jet applicator discharging coating onto the web, and further comprising a doctor blade which is positioned to engage the coating on the web as the web passes an additional counter roll spaced downstream from the counter roll.

16. The apparatus of claim 11 wherein the coating apparatus comprises a slide curtain coater, and further comprising a further pressure sensor positioned on portions of the coating apparatus to measure at least one of a thickness profile, a flow rate profile, a coating color profile, a coating color edge position, and a multi-layer coating width.

17. The apparatus of claim 11 wherein the pressure-sensitive film sensor is selected from the group consisting of an electromechanical film (EMFi) sensor, a force sensing resistor sensor, and a quantum tunneling composite force sensor.

18. The apparatus of claim 16 wherein the further pressure-sensitive film sensor is selected from the group consisting of an electromechanical film (EMFi) sensor, a force sensing resistor sensor, and a quantum tunneling composite force sensor.

* * * * *